W. T. MERSEREAU.
Stud for Frames and Fender-Bars.
No. 203,551.   Patented May 14, 1878.
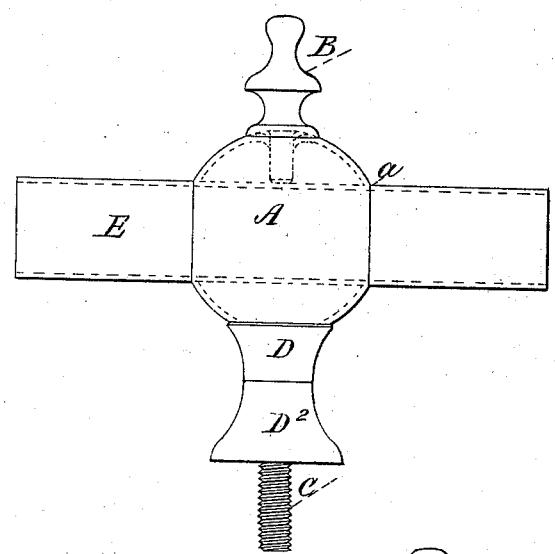
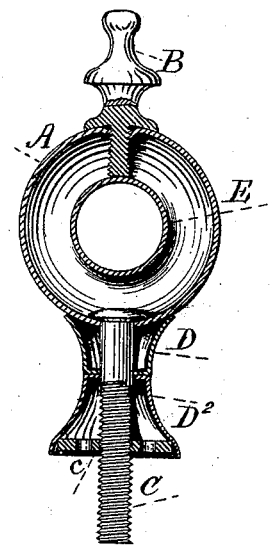
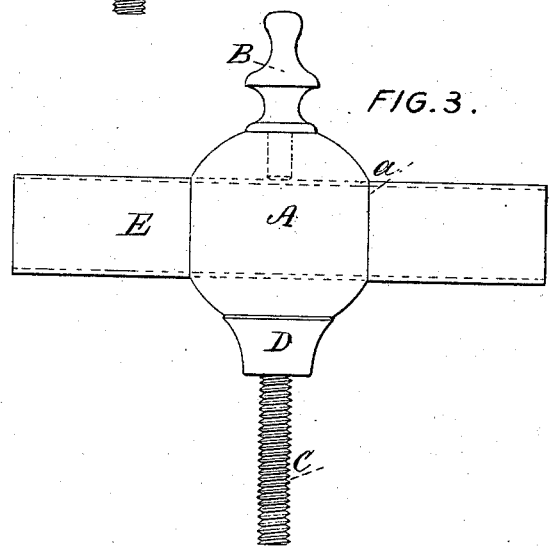
WITNESSES.
INVENTOR.

UNITED STATES PATENT OFFICE.

WILLIAM T. MERSEREAU, OF ORANGE, NEW JERSEY.

IMPROVEMENT IN STUDS FOR FRAMES AND FENDER-BARS.

Specification forming part of Letters Patent No. 203,551, dated May 14, 1878; application filed March 7, 1878.

*To all whom it may concern:*

Be it known that I, WILLIAM T. MERSEREAU, of Orange, Essex county, New Jersey, have invented, made, and applied to use a new and Improved Stud, to be used in the manufacture of frames and fenders for fire-places; and that the following is a full, clear, and correct description of the same, reference being had to the accompanying drawing, making part of this specification, and to the letters of reference marked thereon, in which—

Figure 1 is a front view of my improved stud for frame and fender bars. Fig. 2 is a cross-section of the same. Fig. 3 is a view of the same, one of the cones upon the under side having been removed.

In the drawing like parts of the invention are pointed out by the same letters of reference.

The nature of the present invention consists in the construction, as more fully hereinafter set forth, of an improved stud for supporting upon a fender or fire-place frame the bar usually used in connection with the same.

Heretofore these studs have been cast; but I propose to strike them up in dies, by which economy of manufacture is attained, and an article better in many respects than those now in use results.

To enable those skilled in the arts to make and use my invention, I will describe the same.

The stud, as stated, is to be used in connection with a fender or frame, usually placed around a fire-place, and is intended to support the bar which surmounts the fender, or is attached to the front or face portion of the frame. When applied to a fender it occupies a vertical position, and when to a frame of a fire-place a horizontal position.

The stud may be described as composed of the spherical body A, the sides or a portion of the sphere upon each side being removed, and the sphere being hollow upon its interior, the openings a in the sides being made of the proper size to allow the bar or rod used to be passed through the same.

In the majority of cases I suppose a round rod will be employed; but in case a square or triangular-shaped rod be used the openings may correspond in shape to the rod or bar used.

Through the upper portion of the body A is introduced a set-screw, B, which passes through the body A, or upper side of the same, and, having a bearing upon the bar or rod received within the same, holds it in position.

Through the lower portion of the body A is passed a threaded bolt, C, the projecting portion of the bolt C receiving the conical thimbles D and $D^2$, so placed over the bolt C that the base of the thimble D has its bearing upon the spherical body A, and its squared apex has its bearing upon the squared apex of the thimble $D^2$.

A circular washer or nut, c, having a threaded center, is passed over the threaded bolt C, and, when the stud is used in connection with a fender, has its bearing upon the under side of the metal of which the fender is composed.

The stud, when used in connection with a fender to support the rod E, surmounting the same, occupies a vertical position, and the lower portion of the threaded bolt is passed through an opening in the same, (the fender,) and the circular washer or disk c is screwed up upon the threaded bolt C, and has its bearing upon the under side of the metal of which the fender is composed, the base of the conical thimble $D^2$ bearing upon the upper side. The bar or rod is received within the spherical body A, and the set-screw B bears upon the same.

When used in connection with the frame of a fire-place, the conical thimble $D^2$, owing to the thickness of the metal, may be removed, and the stud in this case is placed in a horizontal position, so as to project beyond or in front of the face, so to speak, of the frame, the nut or circular washer or disk c is screwed up upon the threaded bolt, and bears upon the rear side of the metal of which the frame is composed, the base of the conical thimble D bearing upon the face of the same.

The bar or rod is inserted within the spherical body A, and the set-screw B bears upon the same.

A stud thus made can be produced at a great reduction in price, and consequently can be afforded to the consumer at a lower figure.

A more ornamental appearance can be given to it, and the presence of the set-screw prevents any tendency on the part of the rod or bar to spring out of place.

Having now described my invention, what I claim as new, and desire to secure by Letters Patent, is—

As a new and improved article of manufacture, a stud for frame and fender bars, composed of the spherical body A and the conical thimbles D and D², struck up from sheet metal, and combined with a set-screw, B, and a threaded bolt, C, provided with a circular disk or washer, c, for the purposes fully described.

W. T. MERSEREAU.

In presence of—
PATRICK ROONEY,
FRANK. THOMPSON.